United States Patent
Forrer, Jr. et al.

(10) Patent No.: US 7,882,331 B2
(45) Date of Patent: Feb. 1, 2011

(54) METHOD AND SYSTEM FOR SIMULTANEOUSLY SUPPORTING DIFFERENT BLOCK SIZES ON A SINGLE HARD DRIVE

(75) Inventors: Thomas R. Forrer, Jr., Round Rock, TX (US); Jason Eric Moore, Austin, TX (US); Abel Enrique Zuzuarregui, Paige, TX (US)

(73) Assignee: International Business Machines Corporation, Armonk, NY (US)

( * ) Notice: Subject to any disclaimer, the term of this patent is extended or adjusted under 35 U.S.C. 154(b) by 751 days.

(21) Appl. No.: 11/620,817

(22) Filed: Jan. 8, 2007

(65) Prior Publication Data
US 2008/0109617 A1    May 8, 2008

(51) Int. Cl.
*G06F 12/00* (2006.01)
*G06F 13/00* (2006.01)

(52) U.S. Cl. .................. 711/220; 711/144; 711/154; 711/171; 711/200

(58) Field of Classification Search .............. 711/144, 711/145, 156, 171, 172, 209, 212, 220; 710/4, 710/26, 66, 74, 300, 307
See application file for complete search history.

(56) References Cited

U.S. PATENT DOCUMENTS

| | | | |
|---|---|---|---|
| 4,790,025 A | 12/1988 | Inoue et al. | |
| 5,448,709 A * | 9/1995 | Chandler et al. | 710/52 |
| 5,469,548 A * | 11/1995 | Callison et al. | 711/114 |
| 5,737,745 A | 4/1998 | Matsumoto et al. | |
| 5,892,939 A | 4/1999 | Call et al. | |
| 6,016,544 A | 1/2000 | Henry et al. | |
| 6,125,441 A * | 9/2000 | Green | 712/210 |
| 6,292,855 B1 | 9/2001 | Johnson et al. | |
| 6,339,822 B1 | 1/2002 | Miller | |
| 6,385,711 B1 | 5/2002 | Colligan | |
| 6,571,330 B1 | 5/2003 | McGrath et al. | |
| 6,816,921 B2 | 11/2004 | Jahnke et al. | |
| 6,879,266 B1 * | 4/2005 | Dye et al. | 341/51 |
| 6,898,668 B2 | 5/2005 | Thompson et al. | |
| 6,898,697 B1 | 5/2005 | Gao et al. | |
| 6,922,660 B2 | 7/2005 | Thiesson et al. | |
| 7,181,578 B1 * | 2/2007 | Guha et al. | 711/154 |

* cited by examiner

*Primary Examiner*—Tuan V. Thai
(74) *Attorney, Agent, or Firm*—Yee & Associates, P.C.; Libby Z. Toub

(57) ABSTRACT

A method and system where a hardware platform such as a disk drive is formatted to the largest block length it is desired to read from or write to. Using commands, data can be accessed from the drive in any block length that is equal to or less than the formatted block length.

12 Claims, 3 Drawing Sheets

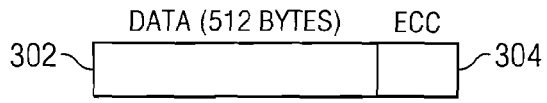
*FIG. 3A*
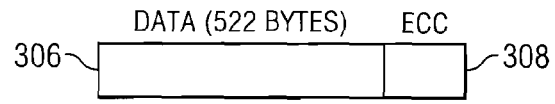
*FIG. 3B*
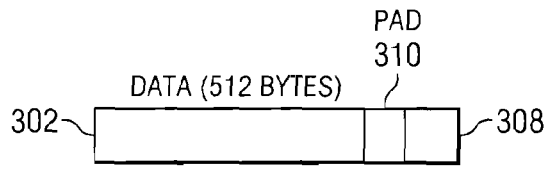
*FIG. 3C*
| BIT  | 7 | 6 | 5 | 4 | 3 | 2 | 1 | 0 |
|------|---|---|---|---|---|---|---|---|
| BYTE |   |   |   |   |   |   |   |   |
| 0 | 1 | 0 | 1 | 1 | 1 | 0 | 1 | 0 |
| 1 | LOGICAL UNIT NUMBER ||| DPO | FUA | 0 | 0 | RELAD |
| 2 | LOGICAL BLOCK ADDRESS (MSB) |||||||||
| 3 | LOGICAL BLOCK ADDRESS |||||||||
| 4 | LOGICAL BLOCK ADDRESS |||||||||
| 5 | LOGICAL BLOCK ADDRESS (LSB) |||||||||
| 6 | TRANSFER LENGTH (MSB) |||||||||
| 7 | TRANSFER LENGTH |||||||||
| 8 | TRANSFER LENGTH |||||||||
| 9 | TRANSFER LENGTH (LSB) |||||||||
| 10 | RESERVED |||||||||
| 11 | BYTES TRANSFERRED (MSB) |||||||||
| 12 | BYTES TRANSFERRED (LSB) |||||||||
| 13 | CONTROL |||||||||
*FIG. 4*

502 — WHEN A READ IS DESIRED, A READ 14 CDB IS GENERATED WITH THE BYTES OF DATA INDICATED IN THE BYTES TRANSFERRED FIELDS OF THE CDB

504 — WHEN READ 14 CDB IS SENT TO THE DRIVE, THE DRIVE SERVO SEEKS TO THE LBA AND THE READ CHANNEL READS THE ENTIRE DATA LENGTH DEFINED BY THE BLOCK LENGTH AND PUTS THE DATA INTO CACHE

506 — DRIVE CACHE MANAGER USES THE BYTES TRANSFERRED FIELD OF THE CDB TO DETERMINE IF THE AMOUNT OF DATA TRANSFERRED EQUALS THE AMOUNT OF DATA RECEIVED

508 — THE DRIVE CACHE MANAGER STRIPS OFF ANY UNREQUESTED BYTES (i.e., BYTES BEYOND THOSE INDICATED IN THE BYTES TRANSFERRED FIELD OF THE CDB)

510 — CACHE MANAGER TRANSFERS THE REQUESTED DATA ACROSS THE INTERFACE (e.g., SCSI) TO THE SCSI INITIATOR, APPENDING THE CORRECT CRC BYTES TO THE DATA OF EACH BLOCK

*FIG. 5*

602 — WHEN THE MODIFIED WRITE 14 CDB IS SENT TO THE DRIVE, THE SUBSEQUENT SCSI DATA PHASE TRANSFERS THE NUMBER OF BYTES SPECIFIED IN THE BYTES TRANSFERRED FIELD OF THE CDB TO THE HARD DRIVE, FOLLOWED BY THE CRC BYTES FOR EACH BLOCK

604 — THE DRIVE THEN SEEKS TO THE LBA AND WRITES THE DATA SENT BY THE INITIATOR

606 — IF THE NUMBER OF BYTES TO BE WRITTEN ARE LESS THAN THE BLOCK SIZE OF THE DRIVE, THE DRIVE WRITES A DEFAULT PAD DATA PATTERN TO FILL OUT THE BLOCK

*FIG. 6*

702 — OPERATING SYSTEM START

704 — SCSI DEVICE DRIVER SENDS THE CHANGE DEFINITION COMMAND TO A HARD DRIVE, BEFORE SENDING ANY MEDIA ACCESS COMMANDS

706 — BLOCK SIZE REMAINS IN PLACE UNTIL AFTER ANOTHER CHANGE DEFINITION COMMAND IS SENT TO THE DRIVE CHANGING THE VALUE AGAIN

*FIG. 7*

METHOD AND SYSTEM FOR SIMULTANEOUSLY SUPPORTING DIFFERENT BLOCK SIZES ON A SINGLE HARD DRIVE

BACKGROUND OF THE INVENTION

1. Technical Field

The present invention relates generally to running multiple operating systems on a single hardware platform. More particularly, the present invention relates to simultaneously operating multiple different operating systems on the same hard drive where the multiple operating systems support different block lengths.

2. Description of Related Art

Computer system interfaces typically include an operating system. The operating system performs basic tasks, such as recognizing input, sending output, and keeping track of data and files.

In some computing environments, it is desirable to run more than one operating system on a particular hardware platform simultaneously. Different operating systems may support different block lengths, or the number of bytes per logical block address (LBA), when accessing disk storage. However, hardware platforms, such as hard drives, are typically formatted to logical block addresses of a particular size, requiring all read and write commands to or from operating systems of the hard drive to also format their commands into blocks of identical size. This means data can only be read or written using the block length that the drive was initialized to when the drive was formatted.

There are currently no known methods for accessing data from a hard drive in any block size other than the formatted block size of the hard drive.

SUMMARY OF THE INVENTION

The present invention provides a system and method wherein a disk drive is formatted to the largest block length that will be read from or written to it. Data is accessed from the drive in any block length equal to or less than the formatted block length, allowing multiple operating systems that support different block sizes to operate on the same hardware platform simultaneously.

An example implementation is described with respect to a SCSI architecture. However, it is noted that other hard drive interface architectures such as IDE (ATA) or SATA can be modified in a similar fashion to implement the invention.

In one preferred embodiment, commands are sent to the hard drive that initialize the logical block addresses (LBAs) to a largest block length that will be used in the multiple operating system platform (e.g., a single hard drive). For example, Command Descriptor Blocks (CBDs) or other equivalent entities are modified by adding, for example, two bytes to the current read and write CBDs.

Read and write operations of the formatted block length behave normally. For an operating system that supports a smaller block length, during read, the read channel reads the entire block length. A drive cache manager strips off unrequested bytes and transfers only the requested data. During write operations for an operating system that supports a smaller block size, the drive writes default data to fill out extra space in the block.

Further details of this and other preferred embodiments are described below.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3A shows a standard 512 byte data block formatting.

FIG. 3B shows a standard 522 byte data block formatting.

FIG. 3C shows a modified data block according to a preferred embodiment.

FIG. 4 shows an innovative command descriptor block consistent with a preferred embodiment.

FIG. 5 shows a process flow for implementing a preferred embodiment of the present invention.

FIG. 6 shows a process flow for implementing a preferred embodiment of the present invention.

FIG. 7 shows a process flow for implementing a preferred embodiment of the present invention.

DETAILED DESCRIPTION OF THE PREFERRED EMBODIMENT

Figure 1:
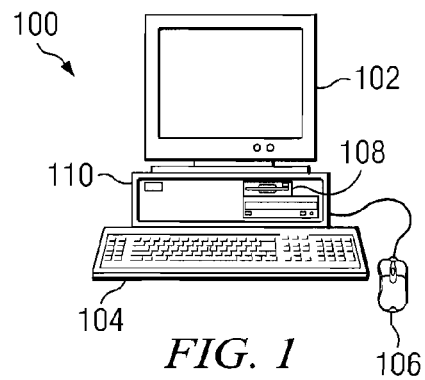
FIG. 1 shows a diagram of a computer system consistent with a preferred embodiment.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
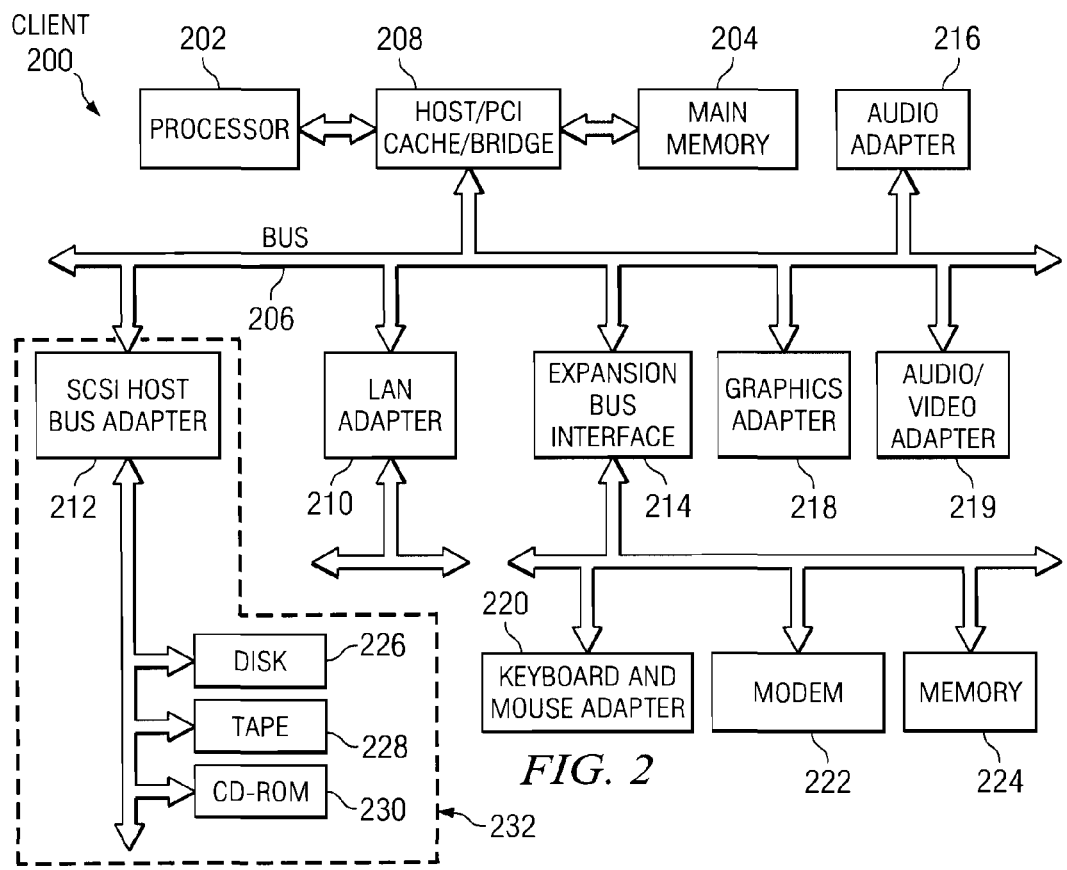
FIG. 2 shows a block diagram of a computer system consistent with a preferred embodiment.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

In the present invention is preferably implemented in a SCSI architecture, though other comparable interfaces are also within the scope of the present invention.

In a SCSI architecture, hard drive block size is defined by performing a Mode Select Command with the block size specified in the Block Descriptor Block Length Field. The Mode Select Command is sent to the hard drive, then the Format Unit Command is sent to the hard drive. This initializes all of the logical block addresses (LBAS) to the specified block length. Read and Write commands transfer data in increments of bytes defined by the block length.

The present invention provides a system and method for formatting a hardware platform (such as a hard drive) to use logical block addresses of the maximum size to be used by any of a plurality of operating systems present on the platform. For example two different OS's may support different LBAs. Then, data is sent to and from the hard drive, and if the data is formatted into blocks of less than the maximum formatted size, extraneous bits are either added to fill in the data block, or extraneous bits are stripped from the data block, as required in the individual case. This allows a hardware platform formatted to one block length to simultaneously support operating systems that use different block lengths. Example implementations are described below.

FIG. 3A shows a standard 512 byte data block formatting. In this example data block, data 302 occupies 512 bytes of the block while error control coding (ECC) or cyclic redundancy check (CRC) bytes 304 are appended to the block. FIG. 3B shows standard formatting for a 522 byte data block. 522 bytes of data 306 occupy the block along with ECC bytes 308.

FIG. 3C shows a data block consistent with a preferred embodiment of the present invention. In this example, the data block is for a hard drive formatted for 522 byte LBAs. However, only 512 bytes are occupied by data 302, because this example LBA is intended to communicate with an operating system that supports 512 byte LBAs. The remaining bytes are occupied by pad 310 sand ECC 308.

Such a block as depicted in FIG. 3C is consistent with a hard drive formatted for 522 byte LBAs, but also allows reads and writes by operating systems that support 512 byte LBAs. For example, in implementations where there are two OSs on the hardware platform, a first OS may support 522 byte addressing while a second OS may support only 512 byte addressing. When the first OS communicates with the hard drive, it sends and receives data in both the data section 302 of the block and in the pad section 310, allowing the full 522 bytes to be communicated.

When the second OS communicates with the hard drive, it sends and receives data in only the data section 302, and filler data fills pad section 310. During read, the read channel reads the entire data length defined by the block length and puts the data into cache. The drive cache manager strips off any unrequested bytes (i.e., the pad section 310) and transfers the requested data across the SCSI to the SCSI initiator, appending the correct ECC bytes to the data of each block. During write, the SCSI data phase transfers the full block of data. If the number of bytes to be written are less than the block size to which the hardware is formatted, the drive writes the default pad data pattern to fill out the block. In preferred embodiments, the default pad data is a predetermined bit, such as all zeros.

In a first embodiment, implementation of the above described procedures requires a change to the various operating systems to remap the currently used Read and Write CDBs. For example, Read 12 and Write 12 CDBs are remapped to Read 14 and Write 14 commands, as described below. No other changes are required to accommodate the different block sizes and the current SCSI protocol.

In a first preferred embodiment of the present invention, the Command Descriptor Block (CDB) is altered by adding two bytes to the current Read 12 and Write 12 CDBs, making them Read 14 and Write 14 CDBs. The new lines are shown in FIG. 4, which depicts the altered CDB of this example implementation. The drive returns only the length of data specified in the bytes transferred field of the new Read 14 and Write 14 CDBs.

In FIG. 4, the CDB shows the several bytes of the CDB. In this example, lines 11 ('Bytes Transferred (MSB)')and 12 ('Bytes Transferred (LSB)') show the newly added lines. These indicate to the hard drive the size of data blocks to be transferred in read and write operations. The placement of the added bytes in the CDB is preferably done to minimize the effect on the CDB structure for the CDBs affected. In this manner, there is minimal effect on the device driver CDB parsing routine.

FIG. 5 shows a process flow for implementing a preferred embodiment of the present invention. It is described in a context wherein the hardware platform (e.g., hard drive) is formatted to the largest block size that will be requested from the drive. The CDB is modified by adding two "Bytes Transferred" fields, which indicate the amount of data to be transferred When a read is desired, a Read 14 CDB is generated with the bytes of data indicated in the Bytes Transferred fields of the CDB (step 502). When Read 14 CDB is sent to the drive, the drive servo seeks to the LBA and the read channel reads the entire data length defined by the block length and puts the data into cache (step 504). The drive cache manager uses the bytes transferred field of the CDB to determine if the amount of data transferred equals the amount of data received (step 506). The drive cache manager strips off any unrequested bytes (i.e., bytes beyond those indicated in the Bytes Transferred field of the CDB) (step 508). The cache manager transfers the requested data across the interface (e.g., SCSI) to the SCSI initiator, appending the correct CRC bytes to the data of each block (step 510).

Write operations for this example preferred embodiment are performed in the same contest of a modified CDB, as described above. FIG. 6 shows an example flowchart. When the modified write 14 CDB is sent to the drive, the subsequent SCSI data phase transfers the number of bytes specified in the bytes transferred field of the CDB to the hard drive, followed by the CRC bytes for each block (step 602). The drive then seeks to the LBA and writes the data sent by the initiator (step 604). If the number of bytes to be written are less than the block size of the drive, the drive writes a default pad data pattern to fill out the block (step 606).

Note that if the system chooses to send Read 12 or Write 12 CDBs then the number of bytes of data transferred is set by the block size the drive was formatted to initially. That is, the drive still supports all CDBs defined in the ANSI Standards in the manner required by these standards.

In another example implementation, the CDB is not altered but instead, a new SCSI command is defined. Note that though this example is described with respect to SCSI architecture, the invention is not limited to this architecture as described above. The following example is described in the context of a newly defined SCSI command that defines the block size, and hence the number of bytes transferred to and from the host when the SCSI Read/Write commands are used. For example, the "Change Definition" command can be modified to add a transfer length field which indicates to the hardware platform the block size.

The process, shown in FIG. 7, begins when the operating system is started(step 702). The operating system SCSI device driver sends the Change Definition command to a hard drive, before sending any media access commands (step 704). Note that a field is added to the Change Definition command that defined the block size that will be used for all media access commands received by the drive. This block size remains in place until after another Change Def command is sent to the drive changing the value again (e.g., back to the originally formatted value) (step 706). The SCSI command preferably sets the transfer size on a per SCSI initiator basis. For a system containing multiple logical partitions, each partition must send the command to the drive before accessing the media to assure the transfer size is correct.

The present invention allows concurrent operation of multiple operating systems (e.g., AIX, OS/400) that support different size logical block addresses on a single hardware platform. Using the methods described herein, the disk drive remains in full compliance with the ANSI SCSI Block Commands Specification. The present invention, though described with reference to SCSI architecture, can be implemented with other architectures such as IDE (ATA) or SATA, for example.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A method of accessing a hard drive, comprising the steps of:
    sending a read command to the hard drive to read a block, wherein the hard drive is formatted to have blocks of a first size;
    reading the data of the block;
    storing the data of the block in a cache;
    comparing the length of the data of the block with an indication of the bytes to be transferred;
    stripping off unrequested bytes from the data of the block;
    sending a first command to the hard drive to define a number of bytes transferred to or from the hard drive, the number of bytes transferred being consistent with a block of a second size, before sending the read command to the hard drive;
    sending a second command to the hard drive, wherein the second command results in the sending the read command to the hard drive; and
    sending a third command to the hard drive to reset the blocks of the hard drive to the first size.

2. The method of claim 1, wherein the indication of the bytes to be transferred is a Bytes Transferred field of a read command descriptor block (CDB).

3. The method of claim 1, wherein the step of sending a read command includes sending a read command descriptor block (CDB) that indicates the number of bytes transferred.

4. The method of claim 1, wherein steps of comparing and stripping are performed by a drive cache manager.

5. The method of claim 1, wherein the second size is smaller than the first size.

6. A system for accessing a hard drive, comprising:
    means for sending a read command to the hard drive to read a block, wherein the hard drive is formatted to have blocks of a first size;
    means for reading the data of the block;
    means for storing the data of the block in a cache;
    means for comparing the data of the block with an indication of the bytes to be transferred;
    means for stripping off unrequested bytes from the data of the block;

means for sending a first command to the hard drive to define a number of bytes transferred to or from the hard drive, the number of bytes transferred being consistent with a block of a second size, before sending the read command to the hard drive;

means for sending a second command to the hard drive, wherein the second command results in the sending the read command to the hard drive; and means for sending a third command to the hard drive to reset the blocks of the hard drive to the first size.

7. The system of claim 6, wherein the indication of the bytes to be transferred is a Bytes Transferred field of a read command descriptor block (CDB).

8. The system of claim 6, wherein the means for sending the read command send a read command descriptor block (CDB) that indicates the number of bytes transferred.

9. The system of claim 6, wherein the means for comparing and means for stripping comprise a drive cache manager.

10. A computer program product for accessing a hard drive comprising:

a computer readable storage medium embodied within a programmable computer processor, wherein computer readable program code is stored in the computer readable storage medium to provide commands for performing:

sending a read command to the hard drive to read a block, wherein the hard drive is formatted to have blocks of a first size;

reading the data of the block;

storing the data of the block in a cache;

comparing the length of the data of the block with an indication of the bytes to be transferred;

stripping off unrequested bytes from the data of the block;

sending a first command to the hard drive to define a number of bytes transferred to or from the hard drive, the number of bytes transferred being consistent with a block of a second size, before sending the read command to the hard drive;

sending a second command to the hard drive, wherein the second command results in the sending the read command to the hard drive; and sending a third command to the hard drive to reset the blocks of the hard drive to the first size.

11. The computer program product of claim 10, wherein the indication of the bytes to be transferred is a Bytes Transferred field of a read command descriptor block (CDB).

12. The computer program product of claim 10, wherein sending a read command includes sending a read command descriptor block (CDB) that indicates the number of bytes transferred.

* * * * *